United States Patent

Chiu

Patent Number: 5,765,855
Date of Patent: Jun. 16, 1998

[54] FOLDABLE STROLLER

[76] Inventor: Ping-Jan Chiu, No. 1146, Chung-Shan Rd., Ta-Chia Chen, Taichung Hsien, Taiwan

[21] Appl. No.: 703,188

[22] Filed: Aug. 26, 1996

[51] Int. Cl.⁶ ............................................. B62B 7/06
[52] U.S. Cl. ............................... 280/642; 280/47.38
[58] Field of Search ................................ 280/642, 643, 280/647, 648, 650, 639, 658, 47.38, 47.4, 62; 403/324, 325, 378, 408.1

[56] References Cited

U.S. PATENT DOCUMENTS

| | | | |
|---|---|---|---|
| 4,105,347 | 8/1978 | Gossage | 403/325 |
| 4,243,342 | 1/1981 | Marto | 403/324 |
| 4,929,113 | 5/1990 | Sheu | 403/324 |
| 4,953,880 | 9/1990 | Sudakoff et al. | 280/47.38 |
| 5,476,275 | 12/1995 | Baechler et al. | 280/47.38 |
| 5,536,033 | 7/1996 | Hinkston | 280/650 |
| 5,611,560 | 3/1997 | Thimming | 280/47.38 |
| 5,695,208 | 12/1997 | Baechler et al. | 280/47.38 |

FOREIGN PATENT DOCUMENTS

| | | | |
|---|---|---|---|
| 203097 | 12/1955 | Australia | 280/639 |
| 73563 | 3/1946 | Norway | 280/647 |

*Primary Examiner*—Robert J. Oberleitner
*Assistant Examiner*—Frank Vanaman
*Attorney, Agent, or Firm*—Leydig, Voit, & Mayer, Ltd.

[57] ABSTRACT

A foldable stroller includes a seat frame unit, a horizontal wheel frame and a locking pin. The seat frame has a U-shaped lower end portion and a plate member formed with a through hole and connected to the lower end portion. The seat frame unit is supported inclinedly on the wheel frame in an unfolded position and is laid on the wheel frame in a folded position by means of a support frame unit. The front section of the wheel frame has a transverse socket unit so that the U-shaped lower end portion of the seat frame unit can be inserted into the socket unit. The socket unit has a receiving groove and a tubular member which is communicated with the receiving groove. The locking pin extends slidably into the tubular member through the through hole of the plate member of the seat frame unit in order to lock releasably the seat frame unit on the wheel frame in the unfolded position.

2 Claims, 8 Drawing Sheets

FOLDABLE STROLLER

BACKGROUND OF THE INVENTION

1. Field of the Invention

This invention relates to a foldable stroller, more particularly to a foldable stroller which has an improved locking unit for positioning the stroller in an unfolded position.

2. Description of the Related Art

Figure 1:
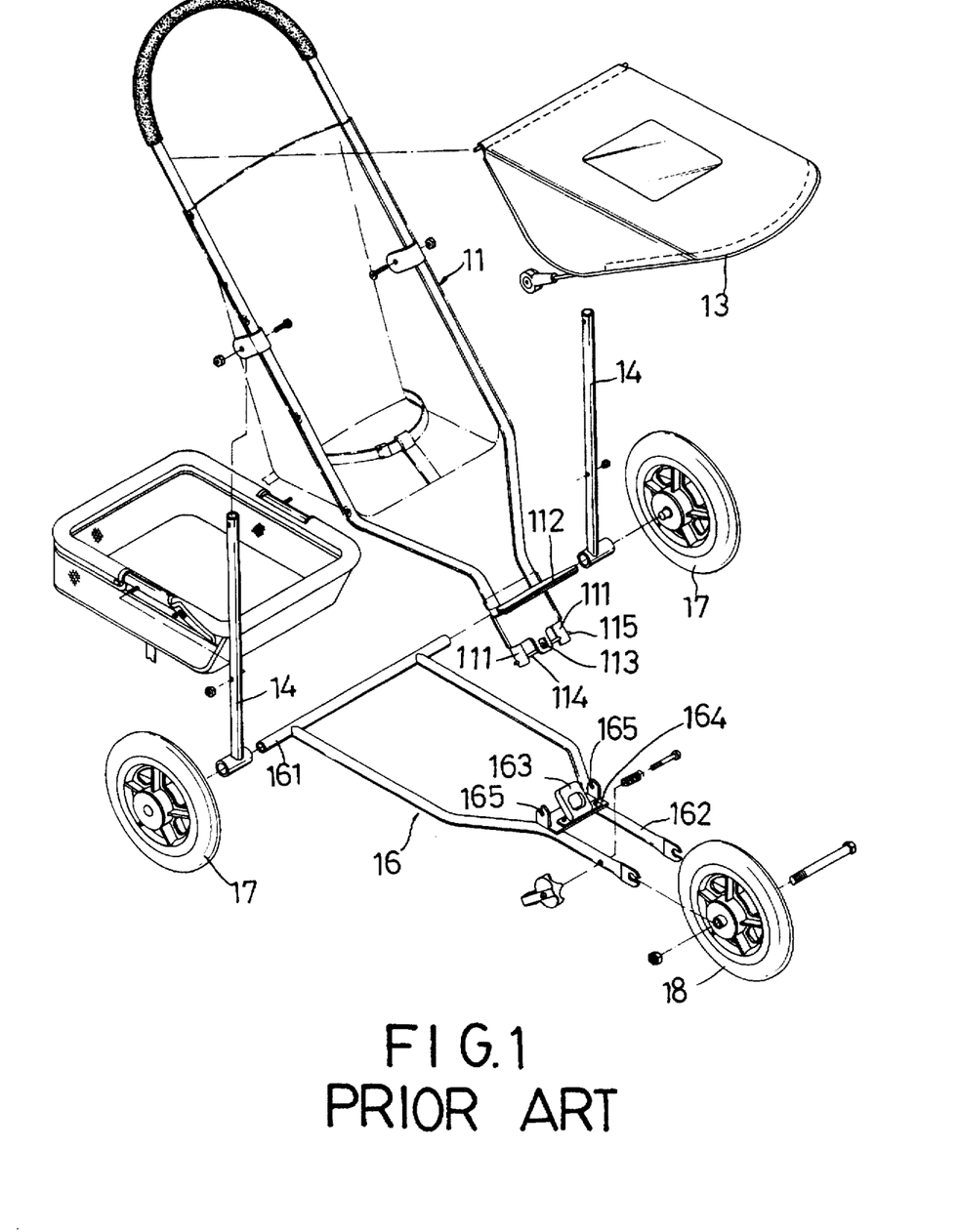
FIG. 1 is an exploded view of a conventional foldable stroller.
Figure 2:
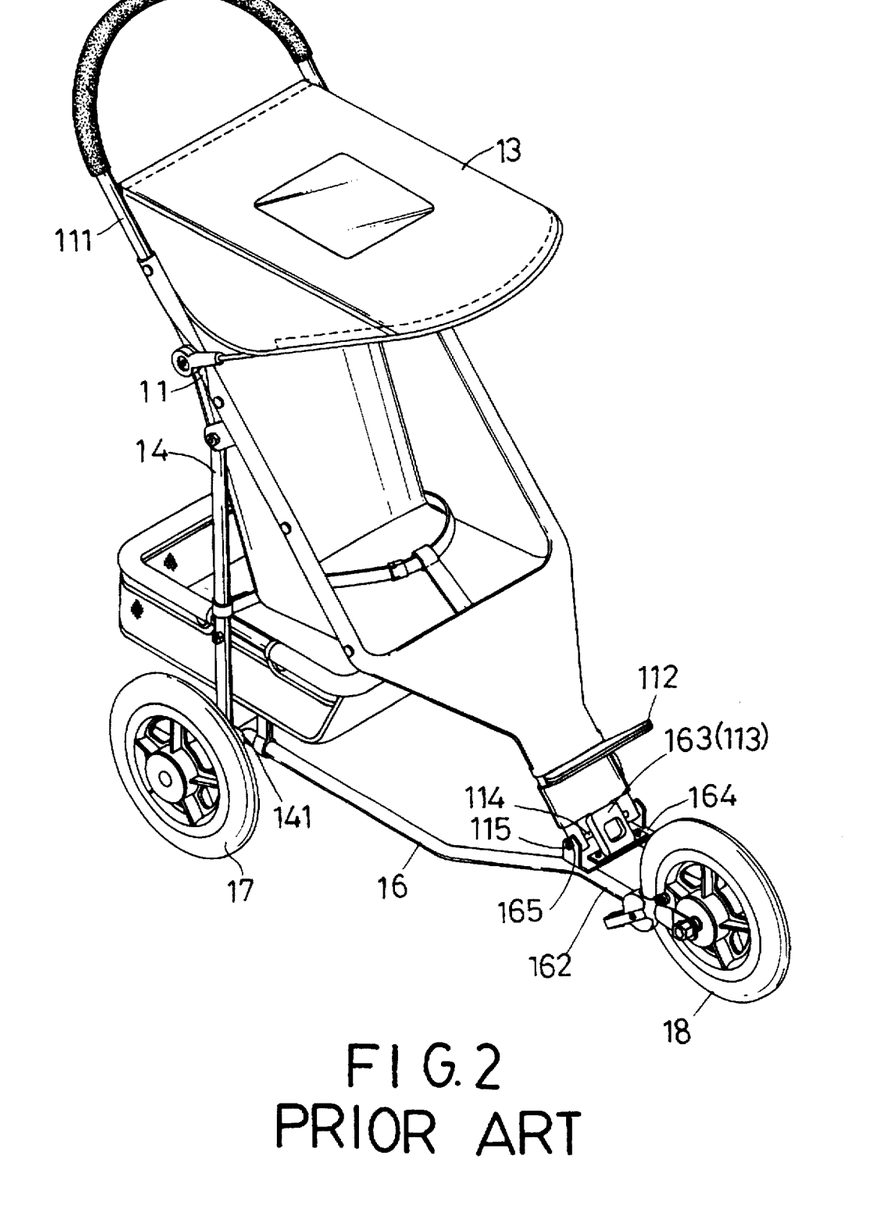
FIG. 2 is a perspective view of the conventional foldable stroller.
Figure 3:
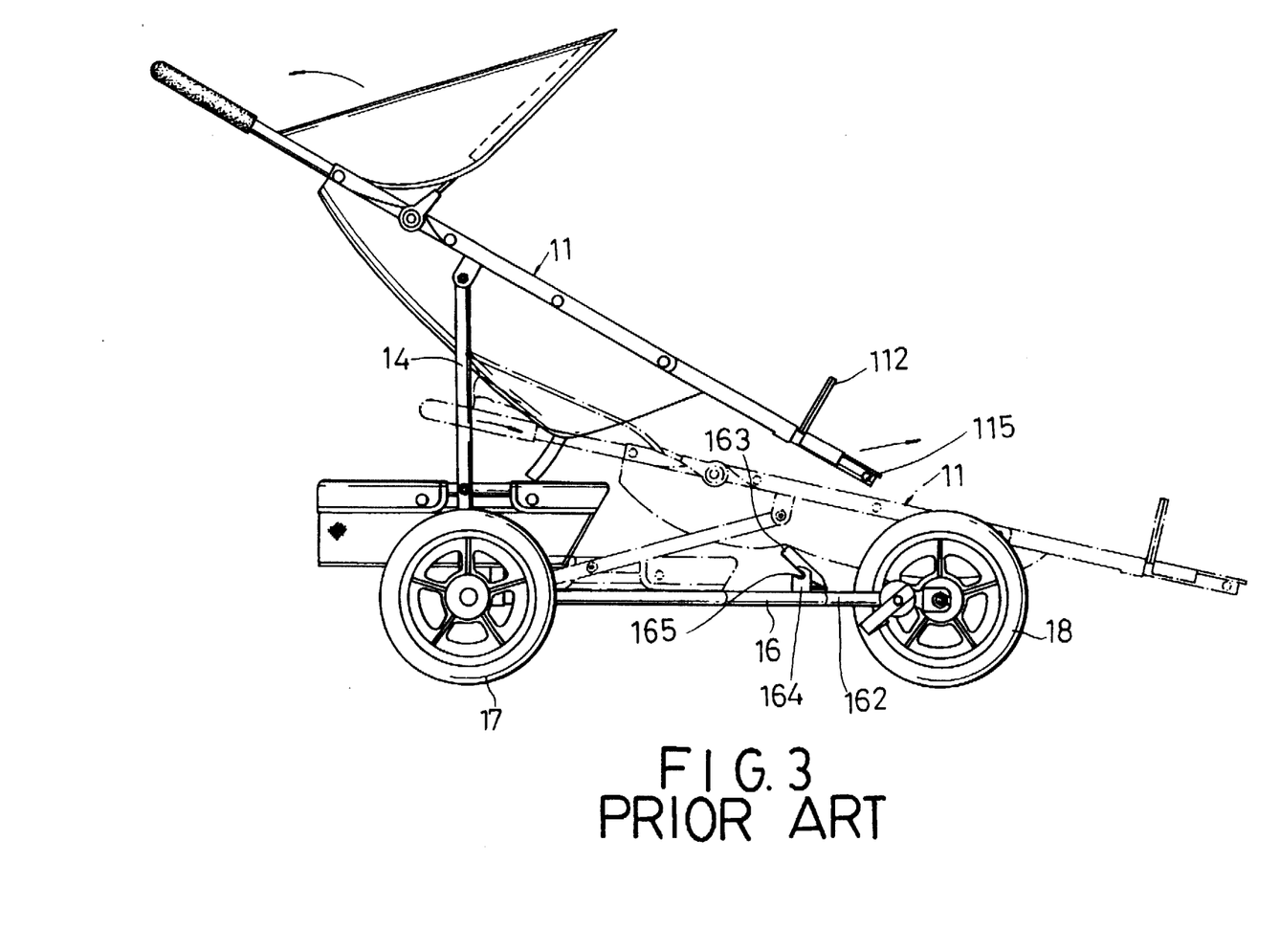
FIG. 3 is a schematic view illustrating how the seat frame unit of the conventional foldable stroller is moved from an unfolded position to a folded position.

The improvement of the present invention is directed to a conventional foldable stroller. Referring to FIGS. 1 and 2, the conventional foldable stroller is shown to comprise a seat frame unit 11 and a horizontal wheel frame 16. The seat frame unit 11 has a lower end portion with two spaced, parallel rods 111, an upwardly and forwardly inclined pedal member 112 which is fixed to the rods 111, and a transverse bar 114 which is connected to the rods 111 below the pedal member 112. The wheel frame 16 has a front section 162 provided with a front wheel 18 and a rear section 161 provided with two rear wheels 17. A support frame unit 20 includes a pair of support frames 14 and interconnects pivotally the rear section 161 of the wheel frame 16 and the seat frame unit 11. Therefore, the seat frame unit 11 can be supported inclinedly on the wheel frame 16 in an unfolded position when the support frames 14 are pivoted to an upright position, as best illustrated in FIG. 2, and can be laid on the wheel frame 16 in a folded position when the support frames 14 are pivoted from the upright position to a generally horizontal position, as best illustrated by the phantom lines in FIG. 3.

A mounting plate 164 with two upright, spaced retaining members 165 is fixed to the front section 162 of the wheel frame 16 near the front wheel 18. The opposite ends 115 of the transverse bar 114 are mounted detachably to the retaining members 165. The foldable stroller further has a locking unit for locking releasably the lower end portion of the seat frame unit 11 to the front section 162 of the wheel frame 16. The locking unit includes an engagement tongue 113 which is fixed to the lower end portion of the seat frame unit 11 below the pedal member 112 and a fastening member 163. The engagement tongue 113 is insertable into the fastening member 163 and is retained by a spring hook member (not shown) of the latter. However, because dirt, sand, etc. are liable to drop into and accumulate in the fastening member 163 when the fastening member 163 is disengaged from the lower end portion of the seat frame unit 11, difficulty in engaging the tongue 113 and the fastening member 163 may be encountered due to the accumulation of the dirt, sand, etc. in the fastening member 163.

SUMMARY OF THE INVENTION

It is therefore a main object of the present invention to provide a foldable stroller which can overcome the aforementioned drawback which is commonly associated with the conventional foldable stroller.

According to the present invention, the foldable stroller comprises:

- a seat frame unit having a U-shaped lower end portion with two spaced arm sections, and a plate member with a through hole, the plate member being connected between the arm sections of the U-shaped lower end portion;
- a horizontal wheel frame having a front section and a rear section, and a support frame unit interconnecting pivotally the rear section of the wheel frame and the seat frame unit so that the seat frame unit can be supported inclinedly on the wheel frame in an unfolded position when the support frame unit is pivoted to an upright position and can be laid on the wheel frame in a folded position when the support frame unit is pivoted to a generally horizontal position, the front section having a transverse socket unit connected thereto so that the U-shaped lower end portion of the seat frame unit can be inserted into the socket unit when the seat frame unit is in the unfolded position, the socket unit having opposed first and second side walls, a receiving groove defined between the first and second side walls, and a tubular member with a first open end and a second open end which is connected to the first side wall and which is communicated with the receiving groove, the second side wall having a hole which is aligned with the second open end of the tubular member; and
- a locking pin extending slidably into the tubular member through the through hole of the plate member of the seat frame unit in order to lock releasably the seat frame unit on the wheel frame in the unfolded position.

In a preferred embodiment, the locking pin has a notch formed at an intermediate section thereof, and a C-shaped plate is received in the tubular member and engages the notch. The tubular member has an inwardly extending annular flange which is formed adjacent to the first open end thereof and a spring member which is disposed in the tubular member between the annular flange and the C-shaped plate in order to urge the locking pin to extend into the through hole of the seat frame unit, thereby securing the seat frame unit to wheel frame.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 4:
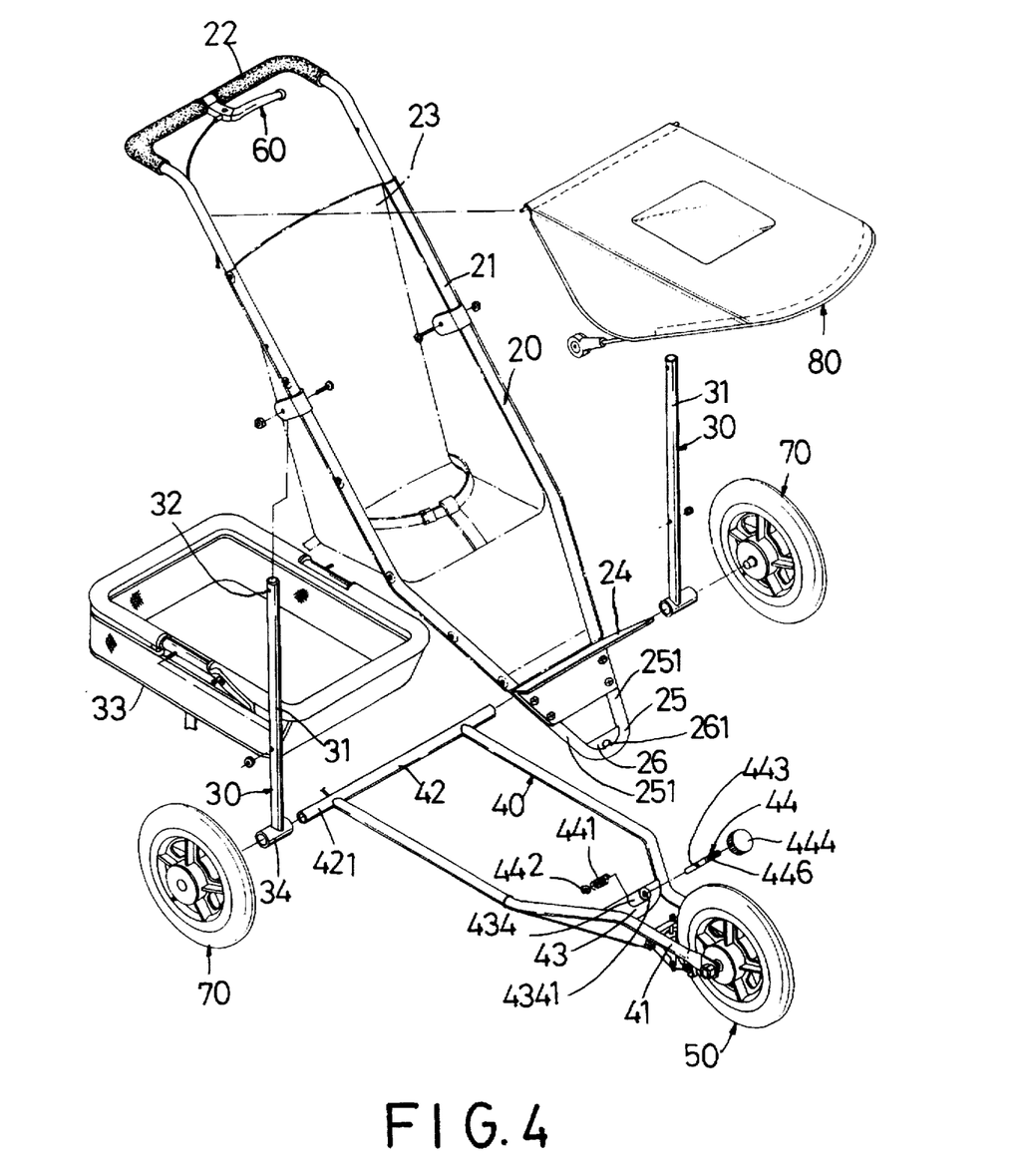
FIG. 4 is an exploded view of a preferred embodiment of a foldable stroller according to the present invention.
Figure 5:
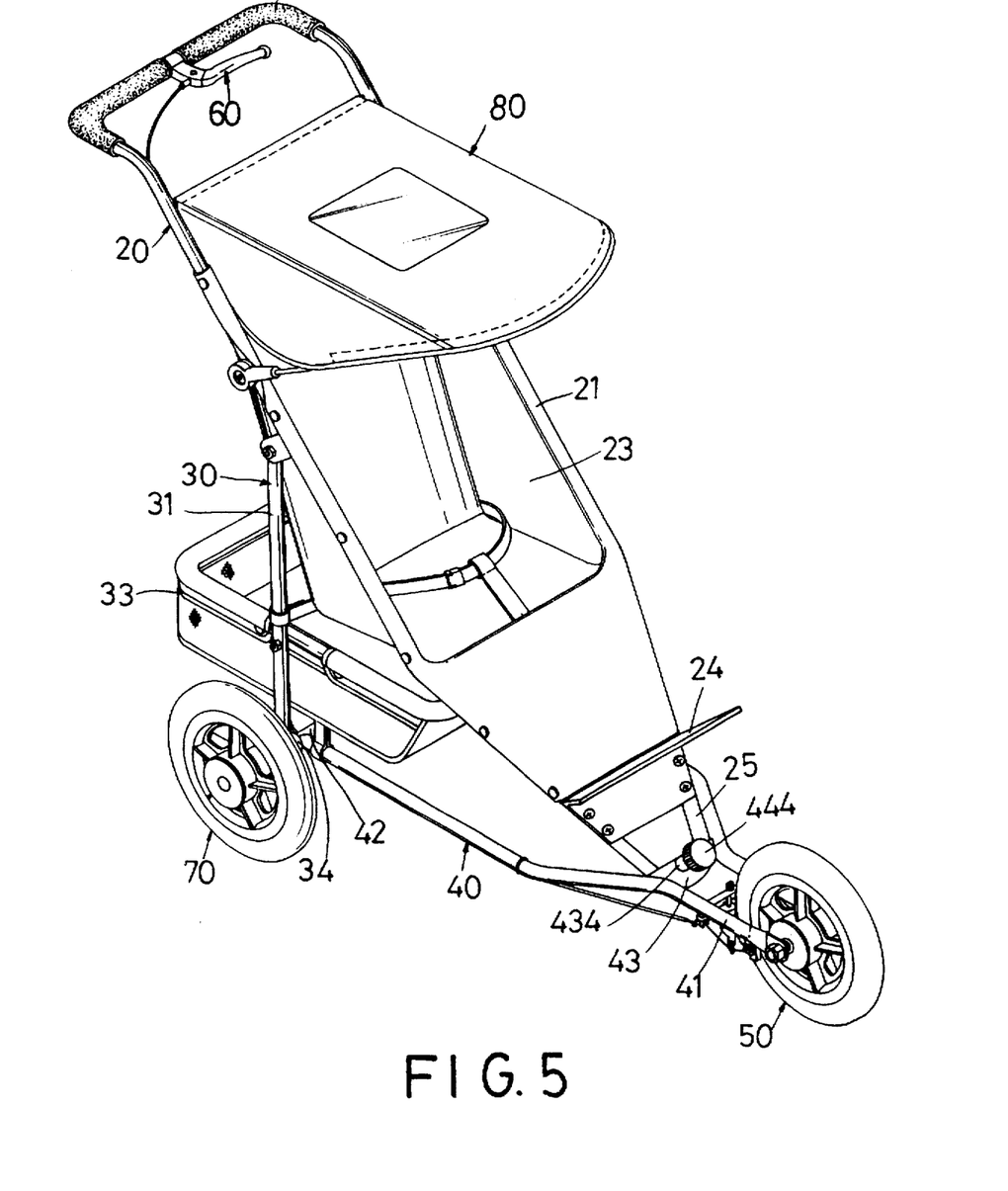
FIG. 5 is a perspective view of the preferred embodiment of the foldable stroller according to the present invention.

Referring to FIGS. 4 and 5, a preferred embodiment of a foldable stroller according to the present invention is shown to comprise a seat frame unit 20 and a horizontal wheel frame 40.

The seat frame unit 20 includes two spaced longitudinal seat frames 21, a handle member 22 interconnecting the upper sections of the seat frames 21, a U-shaped lower end portion 25 interconnecting the lower sections of the seat frames 21, a seat unit 23 mounted between the seat frames 21, and a pedal member 24 mounted on the lower sections of the seat frames 21 above the lower end portion 25. The lower end portion 25 has two spaced arm sections 251, and a plate member 26 formed with a central through hole 261 and connected between the arm sections 251 below the pedal member 24. A canopy unit 80 is mounted to the upper sections of the seat frames 21. The canopy unit 80 can be folded and laid on the seat frame unit 20 in a known manner. A brake device 60 is mounted to the handle member 22 for stopping rotation of a front wheel 50 in a known manner.

Figure 8:
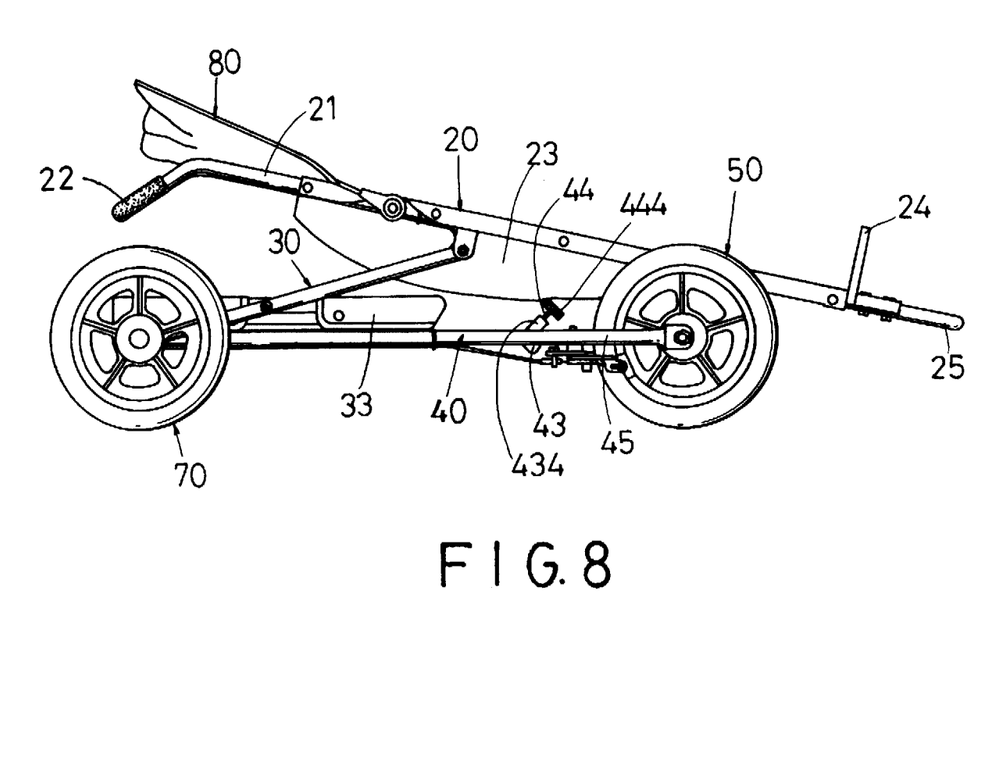
FIG. 8 is a perspective view illustrating the preferred embodiment in a folded position according to the present invention.

The wheel frame 40 has two forwardly extending parallel rods 41 on a front section thereof for mounting the front wheel 50, and a transverse bar 42 on a rear section of the wheel frame 40 for mounting two rear wheels 70 respectively on two opposite end portions 421 thereof. A support frame unit 30 includes two support frames 31 which are mounted between the seat frame unit 20 and the wheel frame 40. More specifically, each of the support frames 31 has an upper end portion 32 which is connected pivotally to the intermediate section of a respective one of the seat frames 21, and a lower end portion 34 which is connected rotatably to a respective one of the opposite ends 421 of the transverse bar 42. Therefore, the seat frame unit 20 can be supported inclinedly on the wheel frame 40 in an unfolded position when the support frame unit 30 is pivoted to an upright position, as best illustrated in FIG. 5, and can be laid on the wheel frame 40 in a folded position when the support frame unit 30 is pivoted to a generally horizontal position, as best illustrated in FIG. 8. In addition, a housing member 33 is mounted between the support frames 31.

Figure 6:
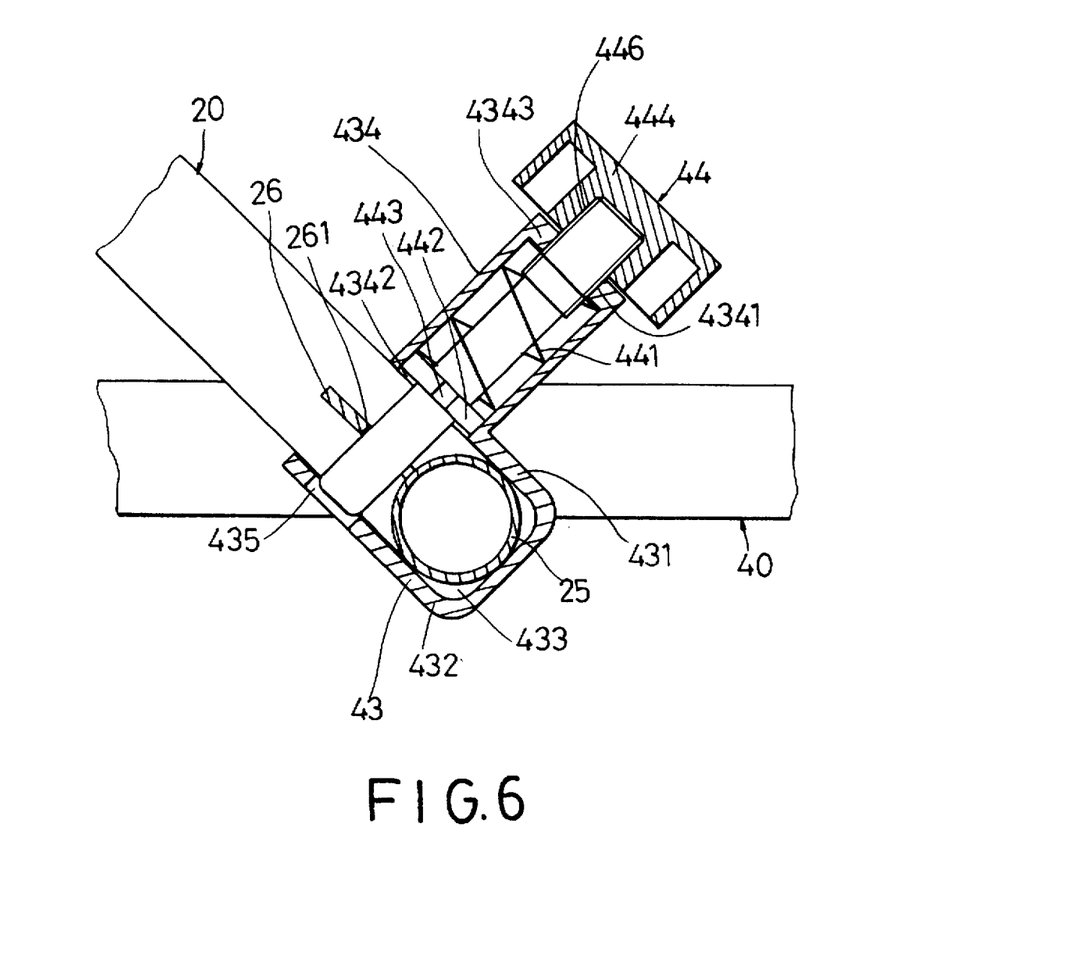
FIG. 6 is a fragmentary sectional view illustrating how the lower end portion of the seat frame unit is locked to the wheel frame by means of a locking pin according to the present invention.

Referring to FIGS. 4 and 6, the front section of the wheel frame 40 has a transverse socket unit 43 connected thereto so that the U-shaped lower end portion 25 of the seat frame unit 20 can be inserted into the socket unit 43 when the seat frame unit 20 is in the unfolded position. The socket unit 43 has opposed first and second side walls 431, 432, a receiving groove 433 defined between the first and second side walls 431, 432, and a tubular member 434 with a first open end 4341 and a second open end 4342 which is connected to the first side wall 431 and which is communicated with the receiving groove 433. The second side wall 432 has a hole 435 which is aligned with the second open end 4342 of the tubular member 434. A locking pin 44 extends slidably into the tubular member 434 and through the through hole 261 of the plate member 26 in order to lock releasably the seat frame unit 20 on the wheel frame 40 in the unfolded position.

Figure 7:
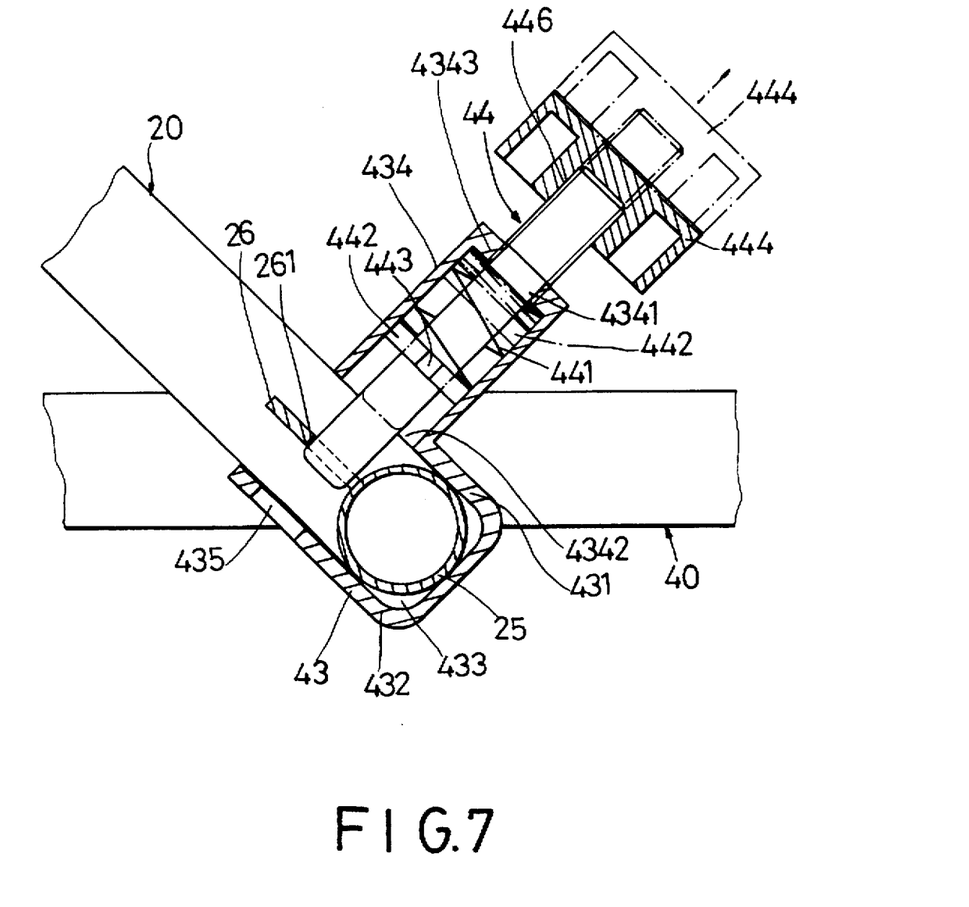
FIG. 7 is a fragmentary sectional view illustrating how the locking pin is moved in order to permit disengaging of the lower end portion of the seat frame unit from the wheel frame according to the present invention.

Referring to FIG. 6, the locking pin 44 has a threaded portion 446 adjacent to an upper end thereof, an enlarged head 444 connected threadedly to the threaded portion 446 adjacent to the upper end of the locking pin 44, a notch 443 formed at an intermediate section thereof, and a C-shaped plate 442 which engages the notch 443. The tubular member 434 has an inwardly extending annular flange 4343 which is formed adjacent to the first open end 4341 thereof and which has an internal thread that engages the threaded portion 446 of the locking pin 44. A spring member 441 is disposed in the tubular member 434 between the annular flange 4343 and the C-shaped plate 442 and is passed through by the locking pin 44 in order to urge the locking pin 44 to extend into the through hole 261 of the seat frame unit 20, thereby securing the seat frame unit 20 to wheel frame 40. The locking pin 44 may be rotated in order to disengage the threaded portion 446 from the internal thread of the annular flange 4343 and may be then pulled upward against the biasing force of the spring member 441 in order to disengage the through hole 261 of the seat frame unit 20, as best illustrated in FIG. 7. After the locking pin 44 is disengaged from the through hole 261, the seat frame unit 20 may be detached from the wheel frame 40 and then folded and laid on the wheel frame 40, as best illustrated in FIG. 8.

It is noted that since dust, sand, etc. are not liable to be accumulated in the tubular member 434 and the through hole 261, the locking pin 44 can be moved smoothly and easily without being blocked by the dirt, sand, etc., thereby facilitating the folding and unfolding operations of the seat frame unit 20 with respect to the wheel frame 40.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A foldable stroller, comprising:

a seat frame unit having a U-shaped lower end portion with two spaced arm sections, and a plate member formed with a through hole and connected between said arm sections of said U-shaped lower end portion;

a horizontal wheel frame having a front section and a rear section, and a support frame unit interconnecting pivotally said rear section of said wheel frame and said seat frame unit so that said seat frame unit can be supported inclinedly on said wheel frame in an unfolded position when said support frame unit is pivoted to an upright position and can be laid on said wheel frame in a folded position when said support frame unit is pivoted to a generally horizontal position, said front section having a transverse socket unit connected thereto so that said U-shaped lower end portion of said seat frame unit can be inserted into said socket unit when said seat frame unit is in said unfolded position, said socket unit having opposed first and second side walls, a receiving groove defined between said first and second side walls, and a tubular member with a first open end and a second open end which is connected to said first side wall and which is communicated with said receiving groove, said second side wall having a hole which is aligned with said second open end of said tubular member; and a locking pin extending slidably into said tubular member through said through hole of said plate member of said seat frame unit in order to lock releasably said seat frame unit on said wheel frame in said unfolded position.

2. The foldable stroller as claimed in claim 1, wherein said locking pin has a notch formed at an intermediate section thereof and a C-shaped plate which is received in said tubular member and which engages said notch, and wherein said tubular member has an inwardly extending annular flange which is formed adjacent to said first open end thereof and a spring member which is disposed in said tubular member between said annular flange and said C-shaped plate in order to urge said locking pin to extend into said through hole of said seat frame unit.

* * * * *